United States Patent
Fujita

(10) Patent No.: US 7,088,415 B2
(45) Date of Patent: Aug. 8, 2006

(54) ELECTRO-OPTIC PANEL AND MANUFACTURING METHOD THEREOF

(75) Inventor: Shin Fujita, Chino (JP)

(73) Assignee: Seiko Epson Corporation, Tokyo (JP)

( * ) Notice: Subject to any disclaimer, the term of this patent is extended or adjusted under 35 U.S.C. 154(b) by 124 days.

(21) Appl. No.: 10/677,341

(22) Filed: Oct. 3, 2003

(65) Prior Publication Data
US 2004/0105140 A1    Jun. 3, 2004

(30) Foreign Application Priority Data
Nov. 12, 2002   (JP)   ............................. 2002-328296

(51) Int. Cl.
*G02F 1/1343*   (2006.01)
(52) U.S. Cl. ....................................... 349/143
(58) Field of Classification Search ................ 349/139, 349/143, 192
See application file for complete search history.

(56) References Cited

U.S. PATENT DOCUMENTS

| | | | |
|---|---|---|---|
| 5,285,301 A * | 2/1994 | Shirahashi et al. | 349/143 |
| 6,812,984 B1 * | 11/2004 | Watanabe et al. | 349/139 |
| 6,917,407 B1 * | 7/2005 | Jeong et al. | 349/139 |
| 2003/0067569 A1 | 4/2003 | Chang et al. | |

FOREIGN PATENT DOCUMENTS

| | | |
|---|---|---|
| JP | A-02-140721 | 5/1990 |
| JP | A 07-333654 | 12/1995 |
| JP | 2000-147538 | 5/2000 |
| JP | B2 3272848 | 1/2002 |
| KR | A 2002-73285 | 9/2002 |
| KR | A-2003-0028955 | 4/2003 |

OTHER PUBLICATIONS

Chinese Office Action w/English Translation.

* cited by examiner

*Primary Examiner*—Andrew Schechter
*Assistant Examiner*—David Chung
(74) *Attorney, Agent, or Firm*—Oliff & Berridge, PLC

(57) ABSTRACT

The invention miniaturizes a liquid crystal panel and thus provides a lightweight panel. A TFT provided so as to correspond to intersections of data lines and scanning lines. A dummy pixel area does not contribute to image display, while an effective pixel area contributes to image display. An identification pattern represents a sequence of scanning lines. By forming the identification pattern in the dummy pixel area, the data lines and a scanning line driving circuit can be provided closer to each other, and a picture frame area can be reduced.

11 Claims, 11 Drawing Sheets

Fig. 9
S1: FIRST STEP
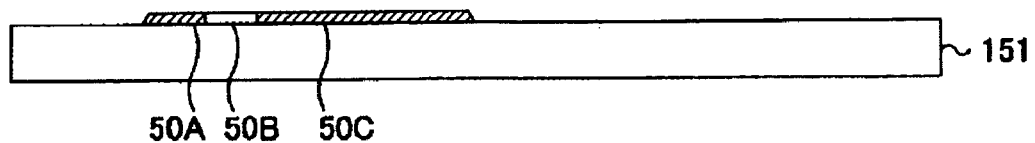
S2: SECOND STEP
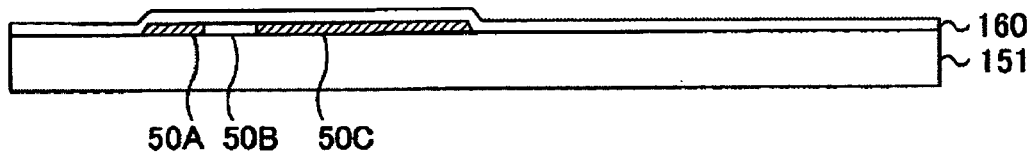
S3: THIRD STEP
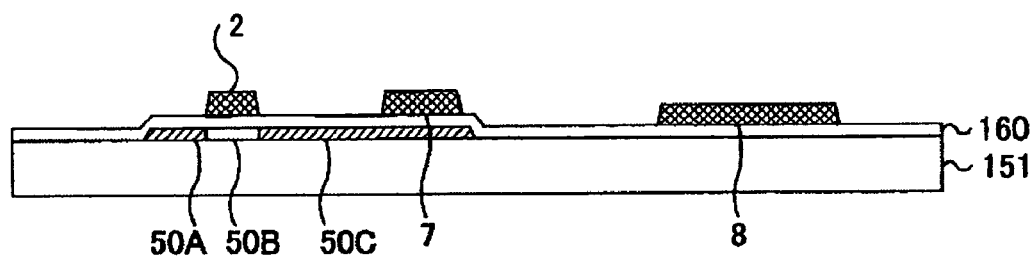
S4: FOURTH STEP
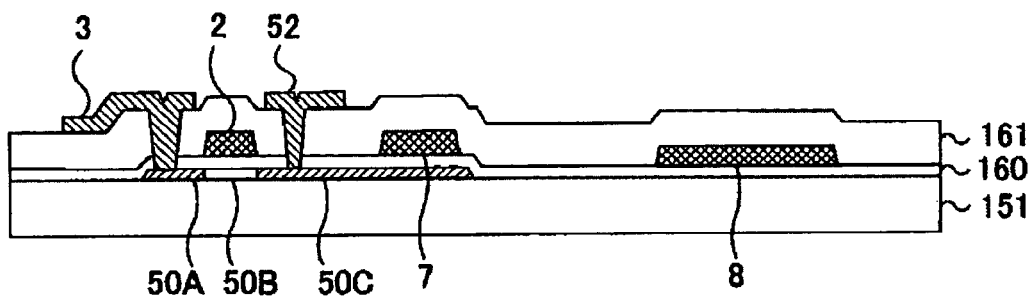
S5: FIFTH STEP
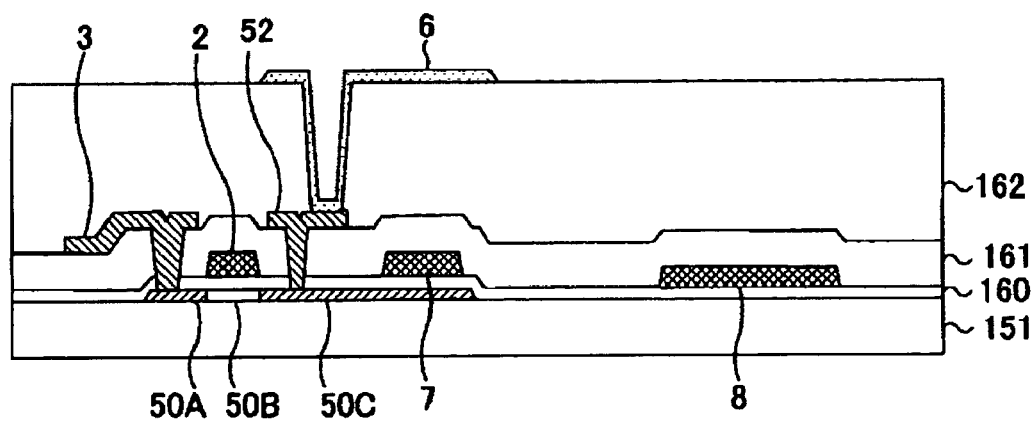

ELECTRO-OPTIC PANEL AND MANUFACTURING METHOD THEREOF

BACKGROUND OF THE INVENTION

1. Field of Invention

The present invention relates to an electro-optic panel having a plurality of scanning lines, a plurality of data lines, and switching elements disposed in a matrix form so as to correspond to intersections thereof.

2. Description of Related Art

A related art active matrix type liquid crystal panel mainly includes an element substrate on which switching elements are provided to respective pixel electrodes arranged in a matrix form, a counter substrate on which a color filter, etc., is formed, and liquid crystal filled between these substrates. In such a structure, applying a scan signal to the switching element via the scanning line, the switching element of interest is turned in a conduction state. In this conduction state, applying an image signal to the pixel electrode via the data line, predetermined electric charge is stored in a liquid crystal layer between the pixel electrode of interest and a counter electrode (common electrode).

Further, on the element substrate of the liquid crystal panel, a scanning line driving circuit to select scanning lines and a data line driving circuit to supply the data lines with data line signals can be formed. An active element of such a driving circuit and the switching element formed in a pixel area are constituted by a thin-film transistor (hereinafter "TFT").

In the above-described liquid crystal panel, an identification pattern can be formed by, for example, numbering or marking the scanning lines and the data lines for the purpose of facilitating the identification of the scanning lines and the data lines for signal adjustment of externally supplied signals and defect analysis when defects are occurred. In this case, the identification pattern is formed on the element substrate and on the periphery of the pixel area.

SUMMARY OF THE INVENTION

Since the identification pattern is used for signal adjustment and defect analysis, it does not directly contribute to image display. On the other hand, in the liquid crystal panel, it is preferred that a distance from the pixel area and an end of the substrate is made as short as possible in light of miniaturization and cost reduction.

For this end, it is necessary to miniaturize the identification pattern formed on the periphery of the pixel area. However, since the identification pattern needs to be of a size that can be checked with a microscope, etc., there is a limit as to how much its occupied area can be reduced.

The invention addresses the above, and provides an electro-optic panel, etc., in which a distance from a pixel area to an end of a substrate can be made to be short.

In order to address or solve the above, an electro-optical panel of the invention includes: a plurality of scanning lines; a plurality of data lines; and switching elements disposed in a matrix form so as to correspond to intersections of the scanning lines and the data lines, and respective pixel areas partitioned by the respective scanning lines and the respective data lines have an effective pixel area that contributes to image display and a dummy pixel area that does not contribute to image display. A part of or a whole of an identification pattern representing identification information to identify the respective scanning lines is formed in the dummy pixel area.

According to the invention, a part of or a whole of the identification pattern with respect to the scanning lines is formed in the dummy pixel area. Since the dummy pixel area does not contribute to image display, display quality will not be degraded, even when the identification pattern is formed therein. Further, since the identification pattern is formed in the area of interest, a picture frame area can be reduced, the electro-optic panel can be miniaturized and lightweight, and the cost can be reduced.

It is preferred that the dummy pixel area has a first area provided on one end of the respective scanning lines and a second area provided on the other end thereof, and the identification pattern is formed by being divided in the first area and the second area. In this case, since the identification pattern is formed by being divided, the picture frame area can be further reduced, even when the number of scanning lines is large and the digit number of the identification information is large.

Further, another electro-optic panel according to the invention includes: a plurality of scanning lines; a plurality of data lines; and switching elements disposed in a matrix form so as to correspond to intersections of the scanning lines and the data lines, and respective pixel areas partitioned by the respective scanning lines and the respective data lines have an effective pixel area that contributes to image display and a dummy pixel area that does not contribute to image display. A part of or a whole of an identification pattern representing identification information to identify the respective data lines is formed in the dummy pixel area. According to the invention, since a part of or a whole of the identification pattern with respect to the data lines is formed in the dummy pixel area, a picture frame area can be reduced, the electro-optic panel can be miniaturized and lightweight, and the cost can be reduced.

It is preferred that the dummy pixel area has a first area provided on one end of the respective data lines and a second area provided on the other end thereof, the identification pattern is formed by being divided in the first area and the second area. In this case, since the identification pattern is formed by being divided, the picture frame area can be further reduced, even when the number of data lines is large and the digit number of the identification information is large.

Furthermore, in the above-described electro-optic panel, it is preferred that the switching element is connected to a pixel electrode, and the identification pattern is smaller than the pixel electrode. In this case, the identification pattern can be formed in a position that overlaps the pixel electrode.

In addition, it is preferred that the above-described electro-optic panel includes an element substrate and a counter substrate opposing thereto, and the plurality of scanning lines, the plurality of data lines, and the respective switching elements are formed on the element substrate, and a scanning line driving circuit to drive the respective scanning lines and a data line driving circuit to drive the respective data lines are formed in an area that does not overlap the identification pattern. In this case, since a part of or a whole of the identification pattern is formed in the dummy pixel area, the occupied area of the driving circuits can be enlarged when the area of the panel is fixed, while the panel size can be reduced when the occupied area of the driving circuits is fixed.

Further, the above-described electro-optic panel may include an element substrate and a counter substrate opposing thereto, and the plurality of scanning lines, the plurality of data lines, and respective switching elements may be formed on the element substrate, and the identification pattern may be formed on the counter substrate. When the electro-optic panel is inspected, the identification pattern is checked from a rear side of the electro-optic panel in an assembled state.

Furthermore, the identification pattern may be constituted by material that shields light, and the identification pattern may be constituted by material that reflects light.

A manufacturing method of an electro-optic panel that includes a plurality of scanning lines, a plurality of data lines, and transistor elements disposed in a matrix form so as to correspond to intersections of the scanning lines and the data lines, respective pixel areas partitioned by the respective scanning lines and the respective data lines having an effective pixel area that contributes to image display and a dummy pixel area that does not contribute to image display, includes: forming a semiconductive layer on a substrate; forming a gate insulative film on the semiconductive layer; forming an identification pattern for identifying at least one of the scanning lines and the data lines in a whole of or a part of the dummy pixel area, concurrently with forming a gate of the transistor element on the gate insulative film. By doing this, since the identification pattern can be formed concurrently with the formation of the gate, it becomes unnecessary to provide a special manufacturing step for forming the identification pattern.

Next, an electronic instrument according to the invention includes the above-described electro-optic panel. For example, a liquid crystal device, a viewfinder used for a video camera, a cellular phone, a notebook computer, a video projector, etc. are included.

BRIEF DESCRIPTION OF THE DRAWINGS

FIGS. 9S1–9S5 are schematics illustrating a manufacturing process of the element substrate 151;

DETAILED DESCRIPTION OF PREFERRED EMBODIMENTS

Figure 1:
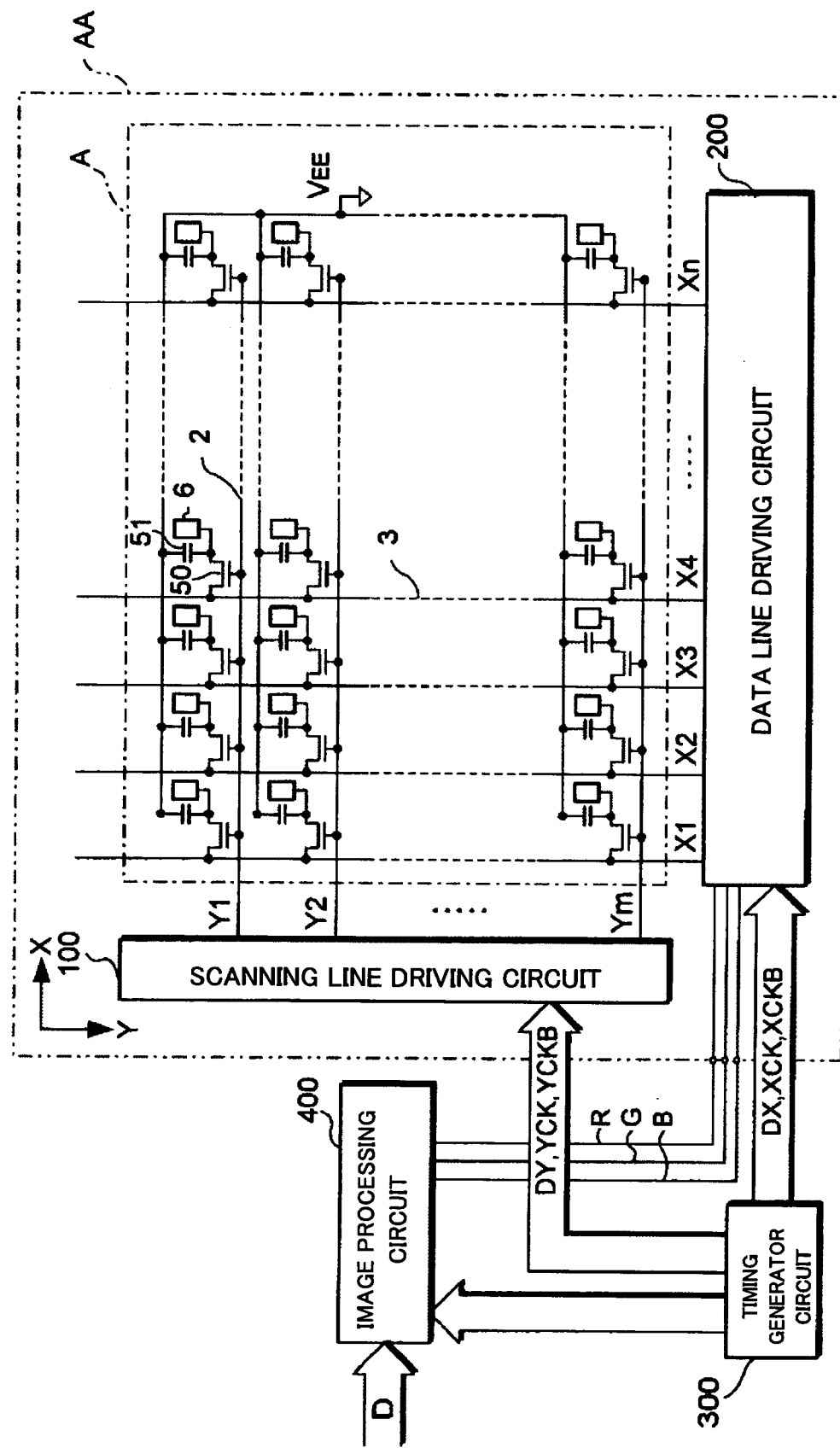
FIG. 1 is a schematic illustrating an overall structure of a liquid crystal device according to an exemplary embodiment of the invention.

Exemplary embodiments of the invention are described below by referring to the drawings.

<1. Overall Structure of Liquid Crystal Device>

FIG. 1 is a schematic illustrating an overall structure of a liquid crystal device according to an exemplary embodiment. This liquid crystal device includes a liquid crystal panel AA, a timing generator circuit 300, and an image processing circuit 400. The liquid crystal panel AA has a pixel area A, a scanning line driving circuit 100, and a data line driving circuit 200 on an element substrate thereof.

Input image data D supplied to the liquid crystal device is, for example, in the form of three-bit parallel. The timing generator circuit 300 generates, in synchronous with the image data D, a Y clock signal YCK, an inversion Y clock signal YCKB, an X clock signal XCK, an inversion X clock signal XCKB, a Y transfer start pulse DY, and an X transfer start pulse DX, and supplies them to the scanning line driving circuit 100 and the data line driving circuit 200. Further, the timing generator circuit 300 generates various timing signals to control the image processing circuit 400 and outputs the signals.

The Y clock signal YCK is to determine a period to select the scanning lines 2, and the inversion Y clock signal YCKB is an inversion of a logical level of the Y clock signal YCK. The X clock signal XCK is to determine a period to select the data lines 3, and the inversion X clock signal XCKB is an inversion of a logical level of the X clock signal XCK.

The image processing circuit 400 performs gamma correction, etc., on the input image data D in consideration of light transmission characteristics of the liquid crystal panel AA, and then performs D/A conversion on image data of the respective colors of RGB to generate image signals R, G, and B, and supplies it to the liquid crystal panel AA.

In the pixel area A, m (m is a natural number equal or more than 2) of the scanning lines 2 are formed in a parallel arrangement along the X direction, while n (n is a natural number equal or more than 2) of the data lines 3 are formed in a parallel arrangement along the Y direction, as shown in FIG. 1.

Furthermore, in the vicinity of an intersection of the scanning line 2 and the data line 3, a gate of a TFT 50 is connected to the scanning line 2, while a source of the TFT 50 is connected to the data line 3, and a drain of the TFT 50 is connected to a pixel electrode 6. Moreover, each pixel is constituted by the pixel electrode 6, a counter electrode formed on a counter substrate (described later), and liquid crystal sandwiched between these electrodes. As a result, the pixels are arranged in a matrix form so as to correspond to the respective intersections of the scanning lines 2 and the data lines 3.

Figure 2:
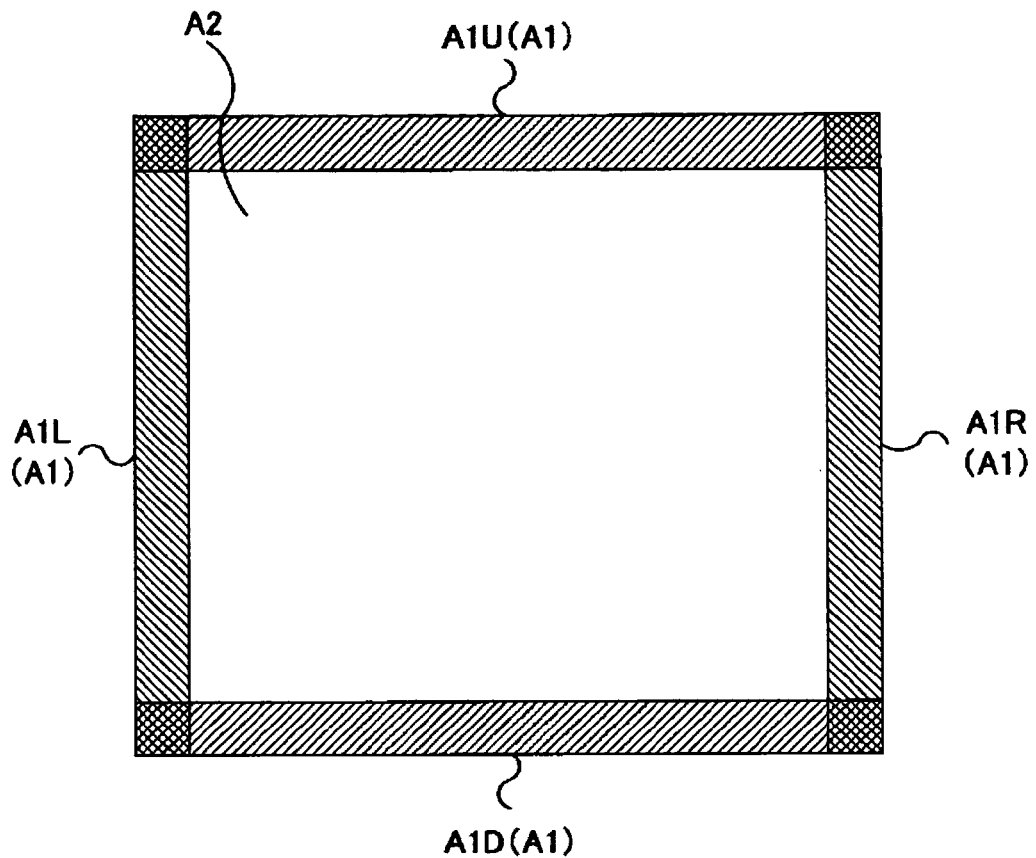
FIG. 2 is a schematic illustrating a dummy pixel area A1 and an effective pixel area A2.

The pixel area A includes a dummy pixel area A1 that does not contribute to image display and an effective pixel area A2 that contributes to image display. FIG. 2 shows the dummy pixel area A1 and the image display effective pixel area A2. Further, the dummy pixel area A1 includes an upper area A1U, a lower area A1D, a left area A1L, and a right area A1R. Specifically, the area A1U includes pixels upper than the first scanning line from the top of the respective scanning lines 2, the area A1D includes pixels lower than the second scanning line from the bottom, the area A1L includes pixels on the left side of the fourth data line, which is counted from the left end of the data lines 3, the area A1R includes pixels on the right side of the third data line, which is counted from the right end of the data lines 3.

Turning to FIG. 1, scan signals Y1, Y2, . . . , Ym are applied line-sequentially in a pulse form to the respective scanning lines 2 to which the gates of the TFT 50 are connected.

Consequently, when a scan signal is supplied to a scanning line 2, the TFT 50 connected to the scanning line of interest is turned on, thereby data line signals X1, X2, . . . , Xn are sequentially written in corresponding pixels, and then, held in a predetermined period.

Since the orientation and order of liquid crystal molecules vary according to a potential level applied to each pixel, gradation display by optical modulation can be performed. For example, since the amount of light passing through the liquid crystal is restricted with the rise of the applied potential in a normally white mode, while relaxed with the rise of the applied potential in a normally black mode, light having a contrast according to image signals is emitted with respect to respective pixels in the entire liquid crystal device. Thereby, a predetermined display can be performed.

Further, a storage capacitor 51 is added in parallel with a liquid crystal capacitor formed between the pixel electrode 6 and the counter electrode to reduce or prevent the held image signals from leaking. The storage capacitor 51 is formed between a capacity line, which is described below, and the drain of the TFT 50.

In the above-described structure, the identification pattern is formed on the element substrate so as to correspond to the respective scanning lines 2 and the respective data lines 3 to analyze defects of the liquid crystal panel AA.

<2. Electric Structure of Liquid Crystal Panel AA>

Figure 3:
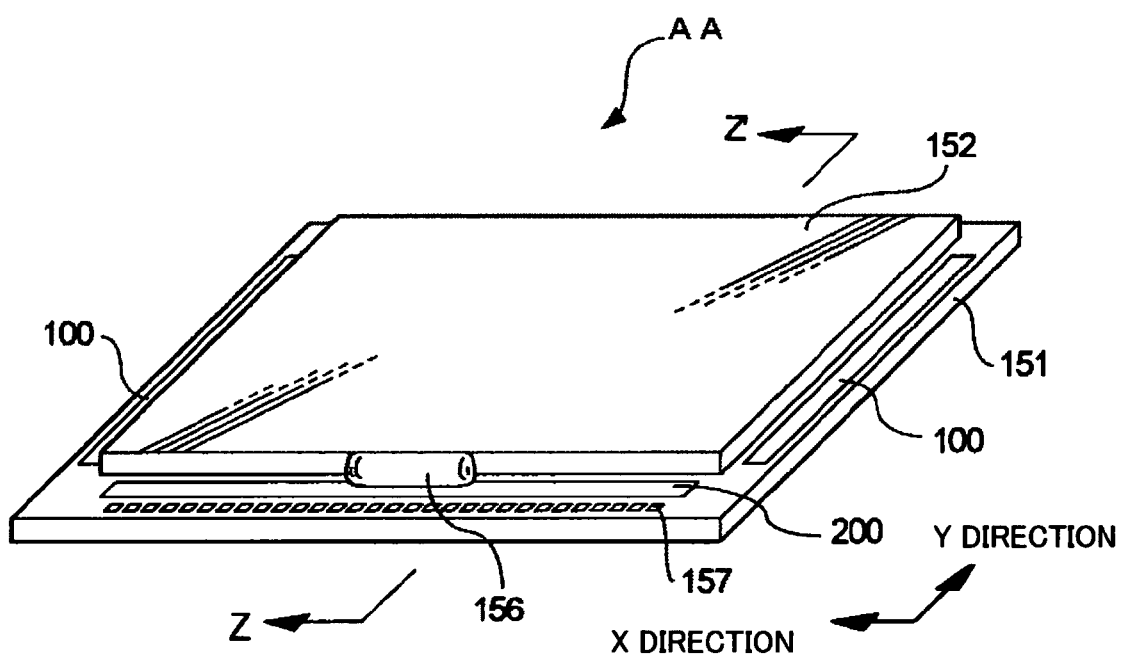
FIG. 3 is a perspective view illustrating an exterior of a liquid crystal panel AA used for the same device.
Figure 4:
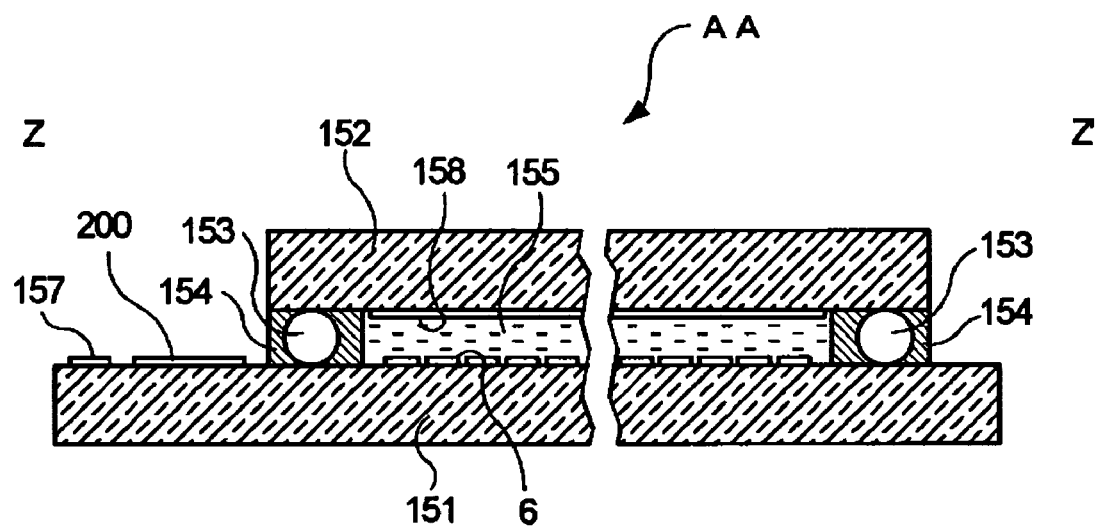
FIG. 4 is a partial sectional view showing the structure of the liquid crystal panel AA.

FIG. 3 is a perspective view illustrating a structure of the liquid crystal panel AA, and FIG. 4 is a sectional view taken along plane Z–Z' in FIG. 3. As shown in these drawings, the liquid crystal panel AA has a structure in which an element substrate 151 of glass, etc., on which pixel electrodes 6, etc., are formed, and a transparent counter substrate 152 of glass, etc., on which a common electrode 158, etc., is formed, are laminated so that their electrode formed surfaces opposed to each other with a constant gap kept by sealing material 154 mixed with spacers 153, and liquid crystal 155 as electro-optic material is enclosed in the gap. Although the sealing material 154 is formed along the periphery of the counter substrate 152, a part of the material is opened to enclose the liquid crystal 155. On this account, after enclosing the liquid crystal 155, the opening part is sealed by a sealing member 156.

In a facing surface of the element substrate 151 and on one outside of the sealing material 154, a data line driving circuit 200 is formed and arranged to drive data lines 3 extending in the Y direction. Further, a plurality of connecting electrodes 157 are formed on this side, and arranged to input various signals from a timing generator circuit (not shown) and image signals. Furthermore, scanning line driving circuits 100 are formed on the sides adjacent to the side, where connecting electrodes 157 are formed, and arranged to drive scanning lines 2 extending in the X direction from both sides.

On the other hand, the common electrode 158 of the counter substrate 152 is intended to provide electric conduction with the element substrate 151 by a conducting member provided in at least one position of four corners in the bonded portion to the element substrate 151. In addition, on the counter substrate 152, according to applications of the liquid crystal panel AA, for example, first, color filters arranged in a striped manner, a mosaic manner, a triangular form, etc., are provided; second, for example, a black matrix, such as resin black in which metal material, such as chrome or nickel, carbon or titanium is dispersed in photo resist is provided; and third, a backlight to irradiate the liquid crystal panel AA with light is provided. Especially, for an application to color light modification, the color filters are not formed but the black matrix is provided on the counter substrate 152. Further, a light shielding film to shield light is formed on the peripheral area of the counter substrate 152, thereby a picture frame as a non-display area is formed.

In addition, alignment films rubbing treated in predetermined directions, etc., are provided on the facing surfaces of the element substrate 151 and the counter substrate 152, respectively, while polarization plates (omitted to be shown) according to orientations are respectively provided on the respective back surfaces thereof. In the case where macro molecule dispersion type liquid crystal, in which micro particles are dispersed in macro molecule, is used as the liquid crystal 155, the above-described alignment films, polarization plates, etc., become unnecessary and as a result, light utilization efficiency is enhanced, and it is advantageous to provide higher brightness and lower power consumption.

Instead of forming a part of or a whole of the peripheral circuits, such as the data line driving circuit 200, scanning line driving circuit 100, etc., on the element substrate 151, for example, a driving IC chip, mounted on a film by the TAB (Tape Automated Bonding) technique, may be electrically and mechanically connected via an anisotropic conductive film provided in a predetermined position of the element substrate 151, or the driving IC chip itself may be electrically and mechanically connected to a predetermined position of the element substrate 151 via an anisotropic conductive film provided by the COG (Chip On Glass) technique.

<3. Configuration of Identification Pattern of Scanning Lines>

Figure 5:
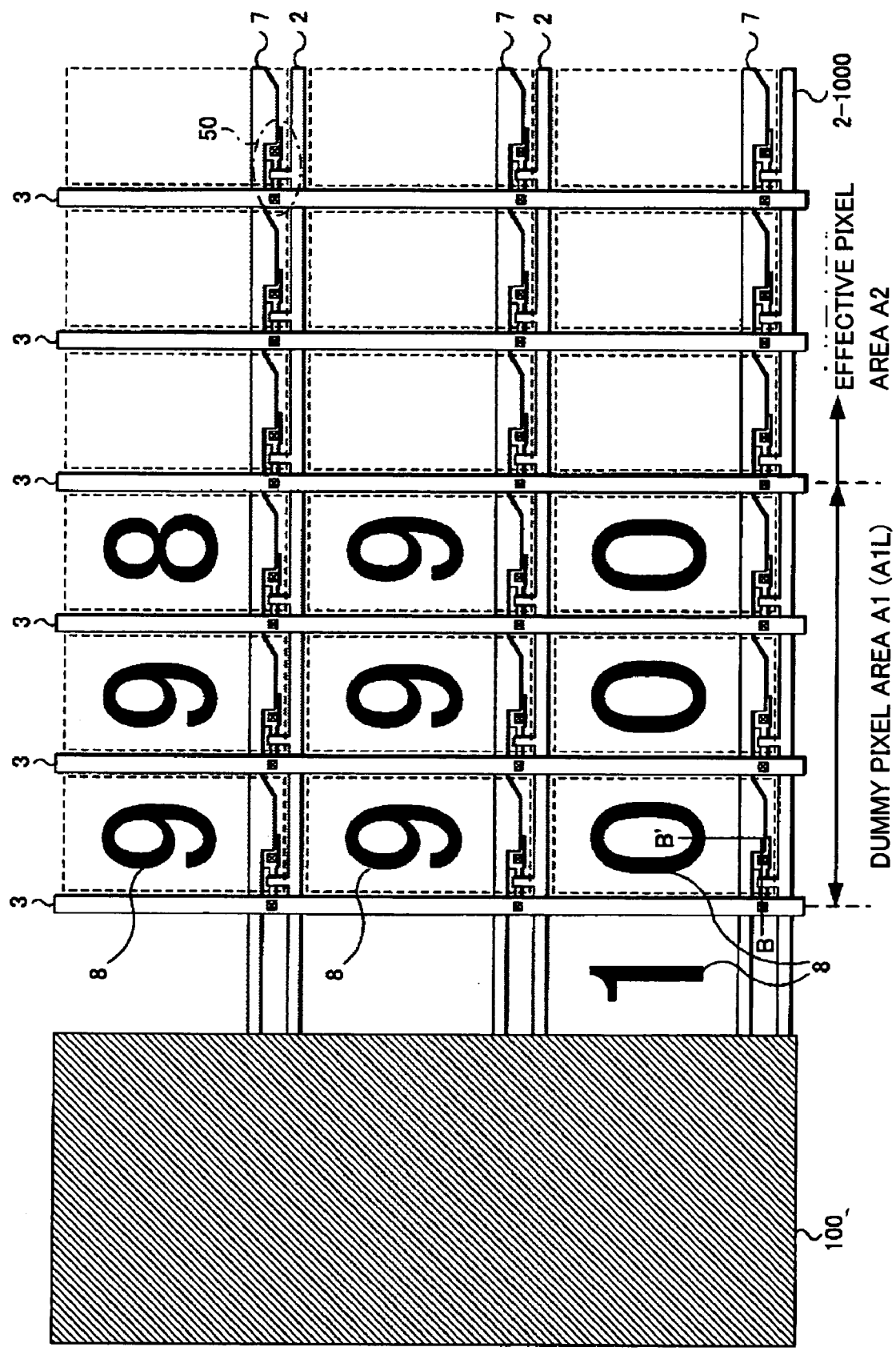
FIG. 5 is a plan view in which a left end part of scanning lines 2 on an element substrate 151, used for the same liquid crystal panel AA, is enlarged.

FIG. 5 is a plan view in which a left end part of the scanning lines 2 on the element substrate 151 is enlarged. As shown in the drawing, a dummy pixel area A1 is formed on the end part of the scanning lines 2, and an effective pixel area A2 is formed inner side thereof.

Moreover, identification patterns 8 are formed in the dummy pixel area A1. For example, the identification pattern 8 on the lower left side has a form representing "1000", thereby it is known that the scanning line 2–1000 is the thousandth scanning line by counting from the top.

The dummy pixel area A1 does not contribute to image display. Therefore, in the case where the identification pattern 8 is formed in an area overlaying the pixel electrode 6 in the dummy pixel area A1, image quality will not be degraded due to this. In this example, since a part of the identification pattern 8 is formed in the dummy pixel area A1, the scanning line driving circuit 100 is formed nearer to the center of the liquid crystal panel AA than in the case where the identification pattern 8 is formed outside of the dummy pixel area A1. Thus, the picture frame area is reduced, and the liquid crystal panel AA can be miniaturized and the cost can be reduced.

The identification pattern 8 may be constituted by light shielding material (including material absorbing light, for example, resin or metal). In this case, when defects are found by performing inspection on the element substrate 151 unit, defect analysis can be performed by inspecting under a microscope.

Figure 6:
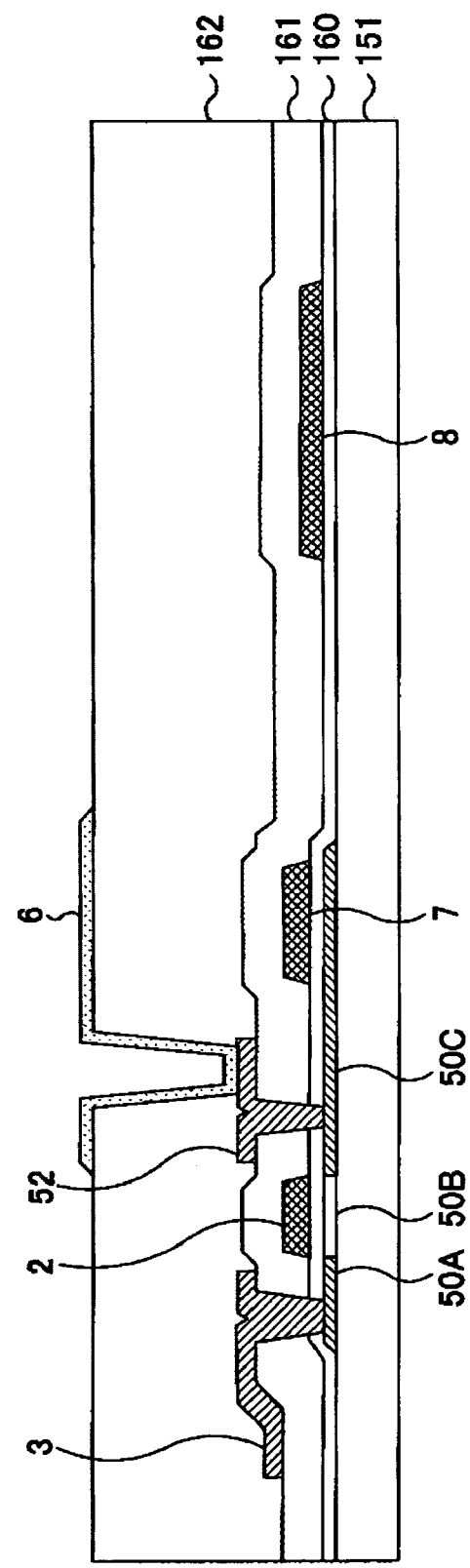
FIG. 6 is a sectional view illustrating a section of the element substrate taken along plane B–B' in FIG. 5.

FIG. 6 is a sectional view of the element substrate 151 taken along plane B–B' shown in FIG. 5. As shown in the drawing, a semiconductive layer (50A to 50C) is formed on the element substrate 151. The semiconductive layer is constituted by a polycrystalline silicon film and has a source region 50A, a channel region 50B, and a drain region 50C. A gate insulative film 160 is an oxidized film and the scanning line 2, a capacity line 7, and the identification pattern 8 are formed thereon. The capacity line 7 is opposite to the drain region 50C via the gate insulative film 160, a storage capacitor 51 is arranged on the facing surface.

The data line 3 is connected to the source region 50A via a contact hole passing through a first interlayer insulative film 161 and the gate insulative film 160. Further, the drain electrode 52 is connected to the drain region 50C via a contact hole passing through the first interlayer insulative film 161 and the gate insulative film 160. Furthermore, a second interlayer insulative film 162 is formed on the upper side of the data line 3 and a drain electrode 52. A contact hole is formed in the second interlayer insulative film 162, and via this contact hole, the pixel electrode 6 is connected to the drain electrode 52. In the above-described structure, the identification pattern 8 is formed concurrently with the scanning line 2 and the capacity line 7. Therefore, a special process is not required to form the identification pattern 8.

In addition, the identification pattern 8 may be constituted by light reflecting material (for example, metal such as aluminum). For example, in this case, when defects are found by performing inspection on the element substrate 151 unit, defect analysis can be performed by inspecting under a microscope. Further, the identification pattern 8 can be checked after assembly of the liquid crystal panel AA. For example, in a transmissive liquid crystal panel AA, the identification pattern 8 of numbering pattern can be visually recognized by observing the liquid crystal panel AA from the back surface side of the element substrate.

With respect to the identification pattern 8 on the lower left side in FIG. 5, since "1000" has the digit number of four, the identification pattern 8 is formed on the outer side of the dummy pixel area A1. Therefore, upper two FIGS. of "1000" may be formed in an area A1L, while lower two FIGS. may be formed in an area A1R. That is, by forming the identification pattern 8 by dividing in the left and right dummy pixel areas A1L and A1R, the identification pattern 8 can be accommodated within the dummy pixel area A1, even when the number of the scanning lines 2 is increased, thereby the picture frame area can be further reduced.

Figure 7:
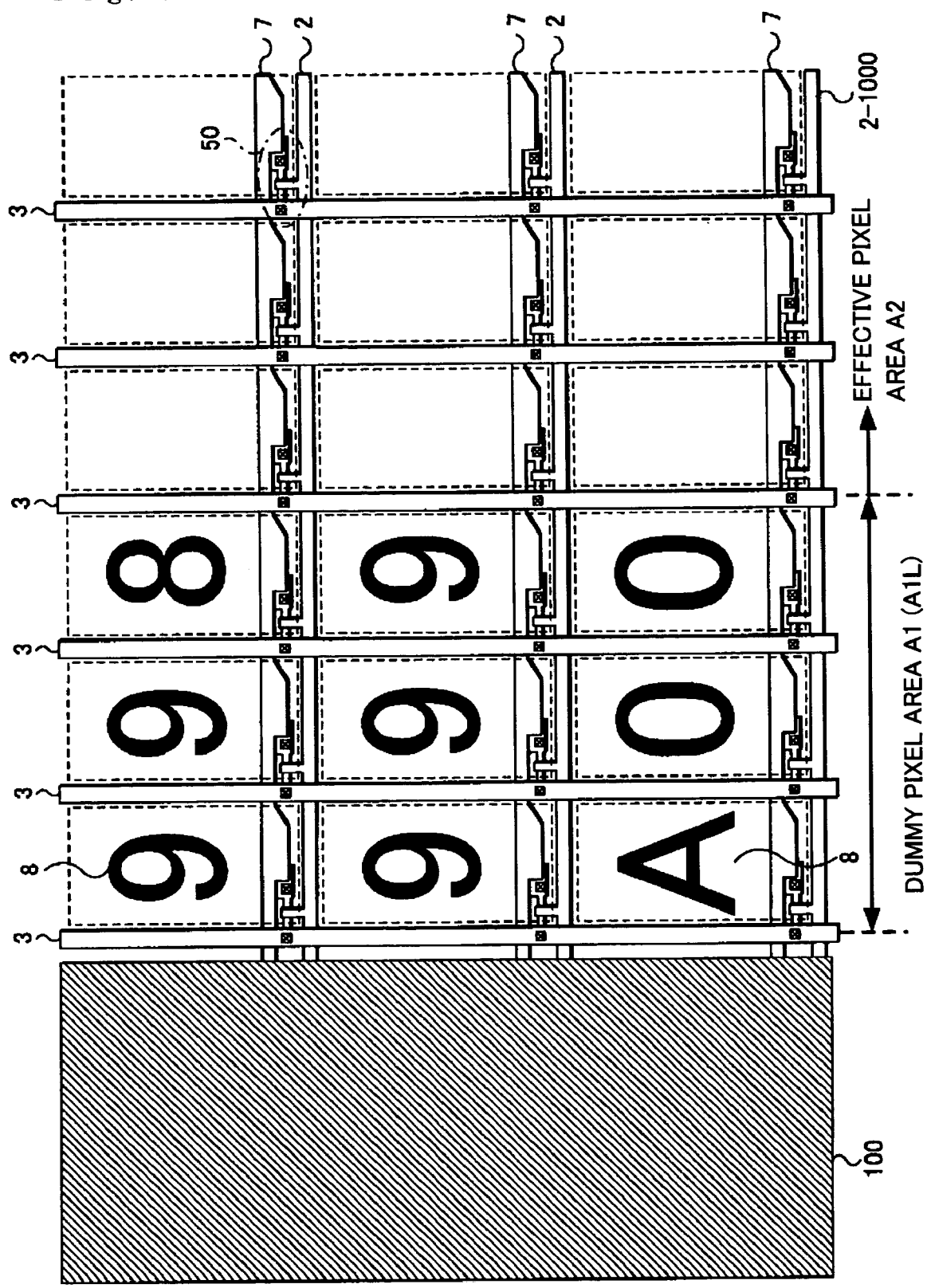
FIG. 7 is a plan view illustrating another example of an identification pattern 8.

Further, the number of the scanning lines 2 is decimally expressed in the example shown in FIG. 5. However, the uppermost digit may be expressed in a hexadecimal form, as shown in FIG. 7. In this case, since the number can be assigned to 1600, that can be applied to a high-definition liquid crystal panel AA having a large number of scanning lines 2. Furthermore, all digits may be expressed in a hexadecimal form.

<4. Configuration of Identification Pattern of Data Lines>

Figure 8:
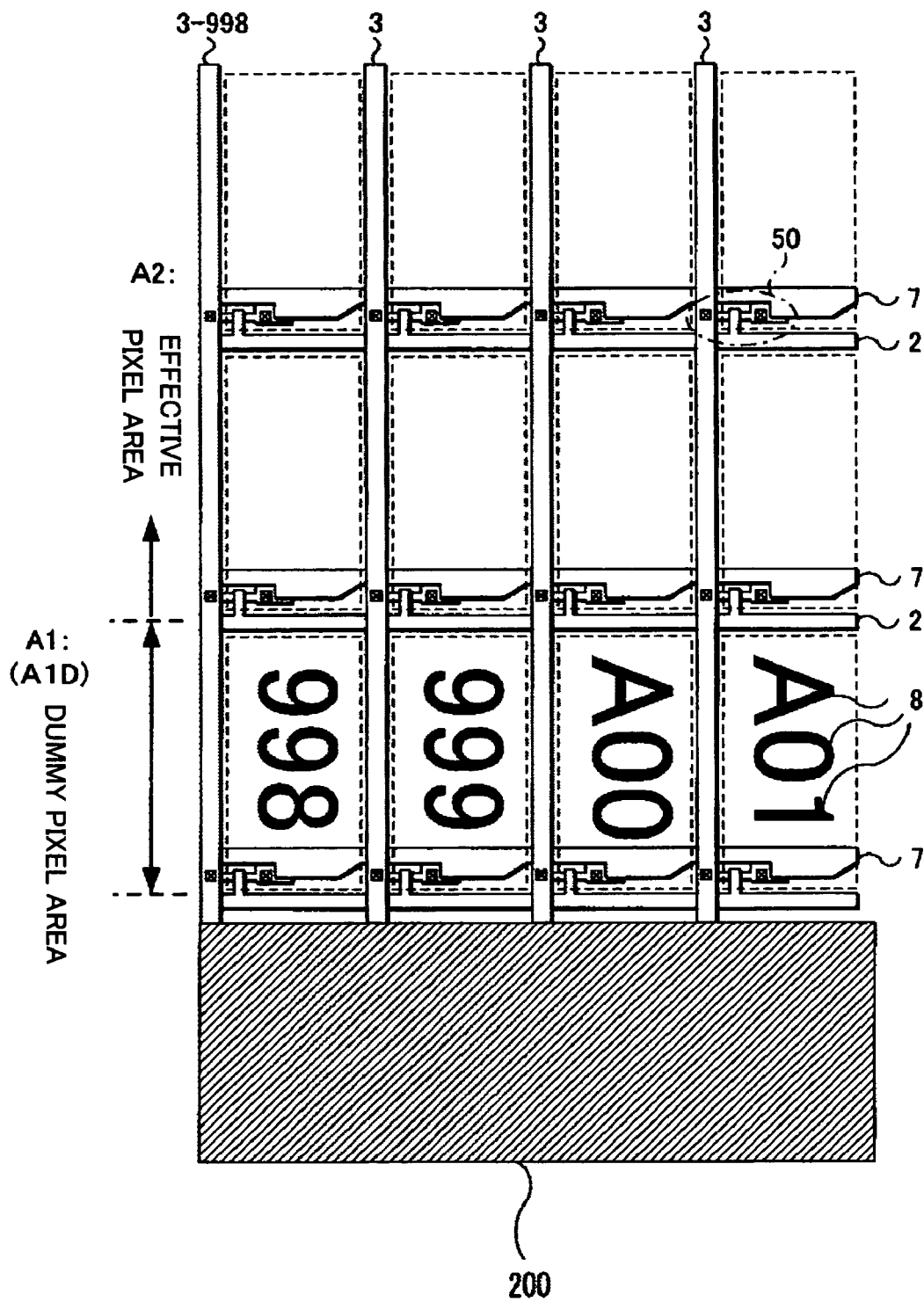
FIG. 8 is a plan view in which a lower end part of data lines 3 on the element substrate 151 is enlarged.

FIG. 8 is a plan view in which a lower end part of the data lines 3 on the element substrate 151 is enlarged. Moreover, identification patterns 8 are formed in the dummy pixel area A1. The identification patterns 8 represent the numbers of data lines 3. For example, the identification pattern 8 on the left end side has a form representing "998", thereby it is known that the data line 3-998 is the 998th data line by counting from the left.

In this example, the whole identification pattern 8 is formed in the dummy pixel area A1. However, a part of the identification pattern 8 may be formed in the dummy pixel area A1, and the rest may be formed between the data line driving circuit 200 and the dummy pixel area A1. Further, in the case where the identification pattern 8 is expressed in a decimal form, upper two digits may be formed in an area A1D, while lower two digits may be formed in an area A1U. That is, the identification pattern 8 may be formed by being divided in the upper and lower dummy pixel areas A1U and A1D. Thereby, the identification pattern 8 can be accommodated within the dummy pixel area A1, even when the number of the data lines 3 is increased, and the picture frame area can be further reduced.

<5. Manufacturing Method of Liquid Crystal Panel AA>

A manufacturing method of the liquid crystal panel AA is described below. In a first step S1, a semiconductive layer (50A to 50C) is formed on the element substrate 151 by using a planar process. In the layer, the source region 50A and the drain region 50C are ion doped, and a high concentration impurity region is formed. In a second step S2, the gate insulative film 160 is formed over the semiconductive layer (50A to 50C).

In a third step S3, the scanning line 2, the capacity line 7, and the identification pattern 8 are concurrently formed. Specifically, conductive material, such as aluminum, is laminated by sputtering treatment, etc., and patterning is performed in a photolithography step, an etching step, etc.

In a fourth step S4, the first interlayer insulative film 161 is formed over the scanning line 2, the capacity line 7, and the identification pattern 8, and the contact hole is formed by dry etching, such as reactive etching or reactive ion beam etching, or by wet etching. Then, the data line 3 and the drain electrode 52 are patterned.

In a fifth step S5, photo-curing type photosensitive acrylic resin, acrylic resin, epoxy resin, etc. is coated byspin-coating, printing, etc., and cured to form the second interlayer insulative film 162. Then, a contact hole is formed by dry etching or wet etching, and ITO is deposited over the entire surface by sputtering, etc., in an oxygen atmosphere. And the pixel electrode 6 is formed through a photolithography step, an etching step, etc., as described above, the element substrate 151 is manufactured.

A manufacturing method of the counter substrate 152 and a manufacturing method of the liquid crystal panel AA from the element substrate 151 and the counter substrate 152 are described below.

As for the counter substrate 152, a light transmissive substrate of glass substrate, etc., is prepared and a light shielding film as the black matrix is formed on the substrate. The light shielding film is formed through a photography step and an etching step after sputtering metal material, such as Cr, Ni, and aluminum. The light shielding film may be formed from material, such as resin black in which carbon, titanium, etc., is dispersed in photo resist, as well as the above-described metal material.

Subsequently, the color filter is formed, and the counter electrode 158 is formed by depositing a transparent conductive thin film of ITO, etc., over the color filter in a thickness of about 50 to 200 nm by a sputtering technique, etc. Further, the alignment film is formed by coating a coating liquid of alignment film, such as polyimide on the entire surface of the counter electrode 158, and then performing rubbing treatment, etc., so as to provide a predetermined pre-tilt angle in a predetermined direction. As described above, the counter substrate 152 is manufactured.

Finally, the thus manufactured element substrate 151 and counter substrate 152 are bonded by the sealing material so that the pixel electrode 6 and the counter electrode 158 may be opposed to each other, and the liquid crystal layer 155 having a predetermined thickness is formed by sucking liquid crystal made by mixing plural kinds of nematic liquid crystal, for example, into the space between both substrates by a method, such as a vacuum suction technique, thereby the liquid crystal panel AA having the above-described structure is manufactured.

<6. Applications>

<6-1: Constitution of Element Substrate etc.>

In the respective exemplary embodiments described above, it is described that the element substrate 151 of the liquid crystal panel AA is constituted by a transparent insulative substrate of glass, etc., and a silicon thin film is formed on the substrate of interest and the elements of the switching element (TFT 50) of the pixel, the data line driving circuit 200, and the scanning line driving circuit 100 are constituted by the TFT in which the source, drain, and channel are formed on the thin film of interest. However, the invention is not limited to these exemplary embodiments.

For example, the element substrate 151 may be constituted by a semiconductive substrate, and the switching element of the pixel and elements of various circuits may be constituted by an insulated gate electric field effect transistor in which a source, a drain, and a channel are formed on the surface of the semiconductive substrate of interest. In the case where the element substrate 151 is constituted by the semiconductive substrate, since the substrate cannot be used as a transmissive display panel, the substrate is used as reflective type by forming the pixel electrode 6 from aluminum, etc. Alternatively, the element substrate 151 may be simply a transparent substrate and the pixel electrode 6 may be of reflective type.

In addition, in the exemplary embodiments described above, the switching element of the pixel is described as a three-terminal element represented by a TFT. However, the element may be constituted by two-terminal element, such as a diode. In the case where the two-terminal element is used as the switching element of the pixel, it is necessary that the scanning line 2 is formed on one substrate and the data line 3 is formed on the other substrate, and the two-terminal element is formed between one of the scanning line 2 and the data line 3, and the pixel electrode. In this case, the pixel is constituted by the two-terminal element, series-connected between the scanning line 2 and the data line 3, and liquid crystal.

Further, in the exemplary embodiments described above, the invention is described along the example when applied to a transmissive liquid crystal display device. However, the invention is not limited to this exemplary application, and the invention can be applied to a reflective liquid crystal display device, a transflective liquid crystal display device, etc., without problems, for example.

Furthermore, the invention is described as an active matrix type liquid crystal display device. However, the invention is not limited to this, and can be applied to a passive type using STN (Super Twisted Nematic) liquid crystal, etc. Moreover, the invention can be applied to a display device by using an electroluminescent element, etc., other than liquid crystal, as electro-optic material to display with its electro-optic effects. In addition, the invention can be applied to a plasma display device, etc. That is, the invention can be applied to all of the electro-optic devices having similar structure to the above-described liquid crystal device.

<6-2: Electronic Instruments>

Cases where the above-described liquid crystal device is applied to various exemplary kinds of electronic instruments are described below.

<6-2-1: Projector>

Figure 10:
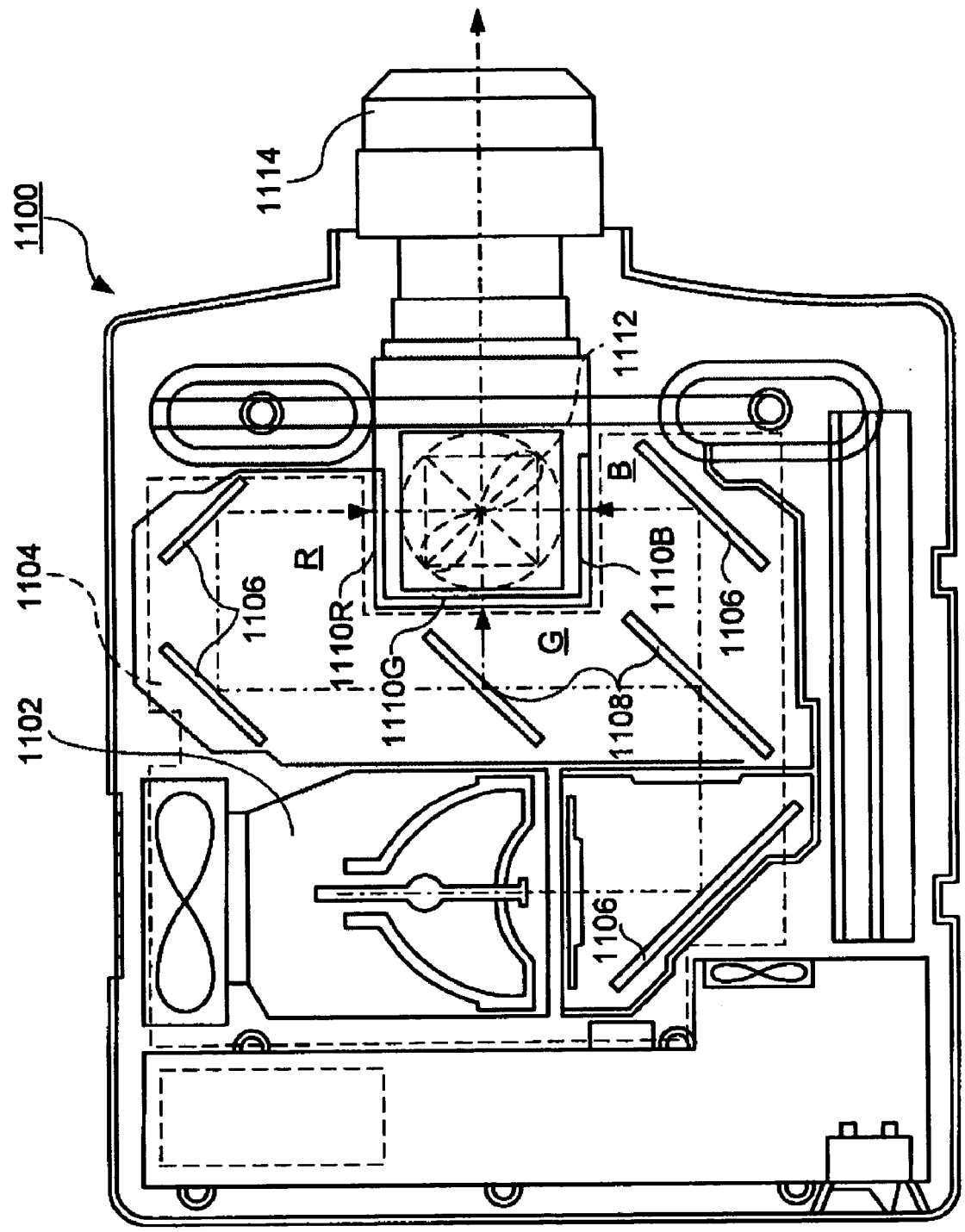
FIG. 10 is a sectional view of a video projector as an example of an electronic instrument to which the same liquid crystal panel AA is applied.

First, a projector using this liquid crystal device as a light valve is described below. FIG. 10 is a plan view illustrating an example of a structure of a projector. As shown in this drawing, a lamp unit 1102 constituted by a white light source, such as a halogen lamp, is provided inside a projector 1100. The projection light emitted from this lamp unit 1102 is separated into three primary colors of RGB by four mirrors 1106 and two dichroic mirrors 1108 disposed within a light guide 1104, and entered into liquid crystal panels AA 1110R, 1110B, and 1110G as light valves corresponding to the respective primary colors.

The structure of the liquid crystal panels 1110R, 1110B, and 1110G is equal to the above-described liquid crystal panel AA, and driven by signals of primary colors of R, G, B supplied from an image signal processing circuit (omitted to be shown), respectively. Then, the light modulated by these liquid crystal panels AA is entered into a dichroic prism 1112 from three directions. In this dichroic prism 1112, the light of R and B is refracted at an angle of 90°, while the light of G travels in a straight line. Therefore, as a result of combining the images of respective colors, a color image will be projected on a screen, etc., via a projection lens 1114.

Focusing attention on display images by the respective liquid crystal panels 1110R, 1110B, and 1110G, the display image by the liquid crystal panel 1110G is needed to be flipped horizontally relative to the display images by the liquid crystal panels 1110R and 1110B.

Since the light corresponding to the respective primary colors R, G, B enters the liquid crystal panels AA 1110R, 1110B, and 1110G by the dichroic mirror 1108, the color filter does not need to be provided.

<6-2-2: Mobile Computer>

Figure 11:
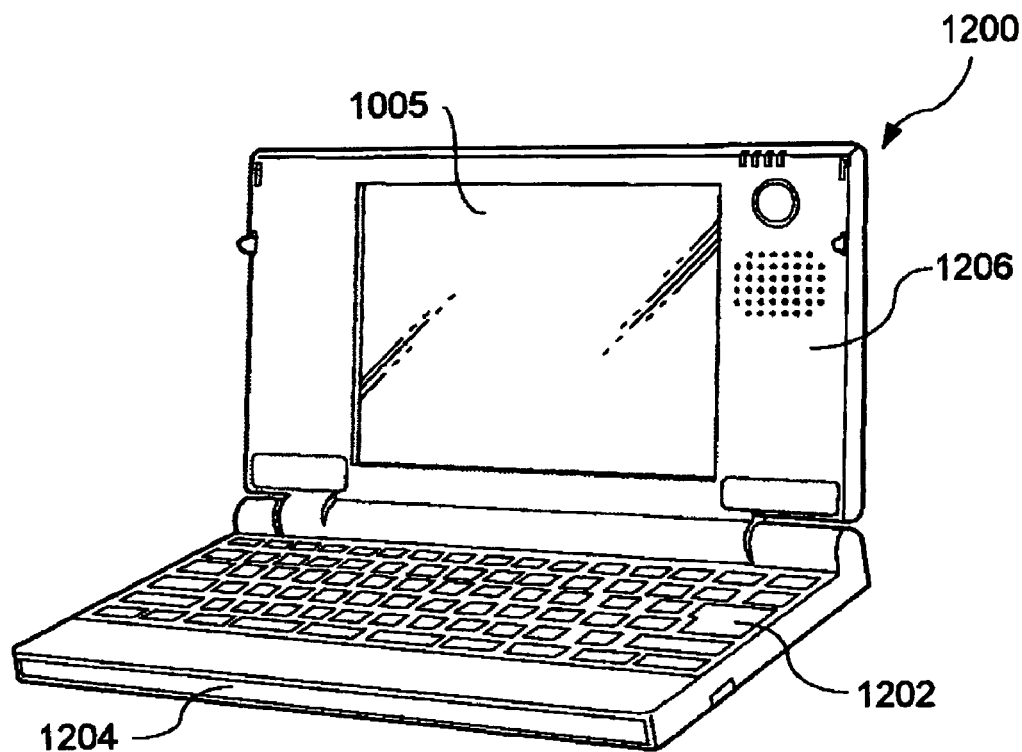
FIG. 11 is a perspective view illustrating a structure of a personal computer as an example of an electronic instrument to which the same liquid crystal panel AA is applied.

An example in which the liquid crystal panel AA is applied to a mobile personal computer is described below. FIG. 11 is a perspective view illustrating a structure of the personal computer. In the drawing, a computer 1200 is constituted by a main body 1204 having a keyboard 1202 and a liquid crystal display unit 1206. The liquid crystal display unit 1206 is constituted by adding a backlight to a back surface of the above-described liquid crystal panel AA 1005.

<6-2-3: Cellular Phone>

Figure 12:
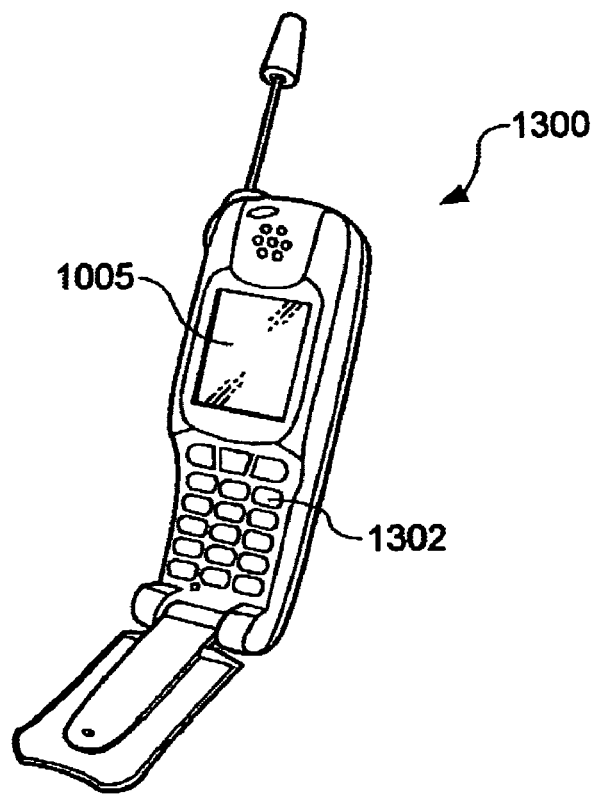
FIG. 12 is a perspective view illustrating a structure of a cellular phone as an example of an electronic instrument to which the same liquid crystal panel AA is applied.

Further, an example in which the liquid crystal panel AA is applied to a cellular phone is described below. FIG. 12 is a perspective view illustrating a structure of the cellular phone. In the drawing, a cellular phone 1300 includes plural operation buttons 1302 and a reflective liquid crystal panel AA 1005. As for the reflective liquid crystal panel AA 1005, a front light is provided on its front surface if necessary.

Other than the electronic instruments shown and described with reference to FIGS. 10 to 12, a liquid crystal television, a video tape recorder of viewfinder type or monitor direct view type, a car navigation system, a pager, an electronic organizer, an electronic desktop calculator, a word processor, a work station, a video phone, a POS terminal, a device with a touch panel, etc. can be used, for example. Moreover, the invention can be applied to the various other kinds of electronic instruments.

<6-3: Other Examples of Identification Pattern>

In the above-described exemplary embodiments, the identification pattern 8 is formed so as to correspond to the respective scanning lines 2 and the respective data lines 3. However, the identification pattern 8 may be corresponded to one of the scanning lines 2 and the data lines 3. Further, the identification pattern 8 is to represent marks (including numerals) to uniquely identify the respective scanning lines 2 and the respective data lines 3. However, cyclic numbers may be represented. For example, "999" may be followed by "000", "001", . . . .

Since a rough position of the subject identification pattern 8 in the whole element can be viewed during operation of the microscope, the scanning line 2 or the data line 3 can be uniquely identified even when represented by cyclic numbers. In other words, the identification pattern 8 is sufficient only to recognize the scanning line 2 or the data line 3, and is not required to identify the lines uniquely.

Figure 13:
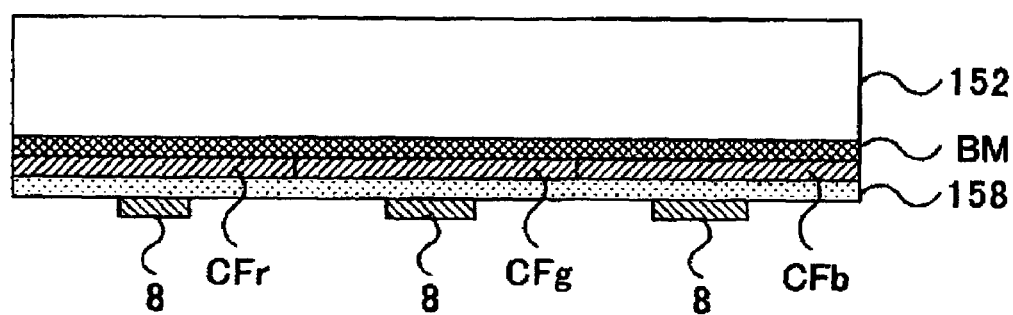
FIG. 13 is a partial sectional view illustrating an example of a counter substrate 152 on which the identification pattern 8 is formed.

Further, in the above-described exemplary embodiments, the identification pattern 8 is formed on the element substrate 151. However, the pattern may be formed on the counter substrate 152. FIG. 13 is a partial sectional view illustrating an example of the counter substrate 152 on which the identification pattern 8 is formed. As shown in the drawing, a light shielding film BM is formed downside of the counter substrate 152, and color filters CFr, CFg, and CFb corresponding to the respective colors of RGB are formed downside of the light shielding film. The respective color filters CFr, CFg, and CFb correspond to respective pixels.

The counter electrode 158 is formed downside of the color filters CFr, CFg, and CFb, and the identification pattern 8 is formed downside of the electrode. Each identification pattern 8 is smaller than the pixel electrode 6. Further, the identification pattern 8 is formed in a part of or a whole of the dummy pixel area A1 similarly in the above-described exemplary embodiments. Here, it is preferred that the identification pattern 8 is made of light reflecting material such as aluminum. After assembly of the transmissive liquid crystal panel AA, the identification pattern 8 can be checked by observing from the back surface side of the element substrate under a microscope. Further, in the case where the liquid crystal panel AA is of reflective type or transflective type, by providing the reflective pixel electrode, formed on the element substrate 152, in a position other than the identification pattern 8 is located, after assembly of the liquid crystal panel AA, the identification pattern 8 can be checked by observing from the back side of the element substrate under a microscope.

What is claimed is:

1. An electro-optical panel, comprising:
   a plurality of scanning lines;
   a plurality of data lines that intersect the scanning lines;
   pixels disposed in a matrix form so as to correspond to intersections of the scanning lines and the data lines, each pixel including a switching element and a pixel electrode;
   a pixel area including the pixels and having an effective pixel area that contributes to image display and a dummy pixel area that does not contribute to image display; and
   an identification pattern representing identification information that identifies the respective scanning lines, at least a part of the identification pattern being formed in the dummy pixel area to overlap with the pixel electrode of the dummy area between the adjacent scanning lines.

2. The electro-optical panel according to claim 1, the dummy pixel area having a first area provided on one end of the respective scanning lines, and a second area provided on an other end thereof,
   the identification pattern being formed by being divided in the first area and the second area.

3. An electro-optical panel, comprising:
   a plurality of scanning lines;
   a plurality of data lines that intersect the scanning lines;
   pixels disposed in a matrix form so as to correspond to intersections of the scanning lines and the data lines, each pixel including a switching element and a pixel electrode;
   a pixel area including the pixels and having an effective pixel area that contributes to image display and a dummy pixel area that does not contribute to image display; and
   an identification pattern representing identification information that identifies the respective data lines, at least a part of the identification pattern being formed in the dummy pixel area to overlap with the pixel electrode of the dummy pixel area between the adjacent data lines.

4. The electro-optical panel according to claim 3, the dummy pixel area having a first area provided on one end of the respective data lines, and a second area provided on an other end thereof,
   the identification pattern being formed by being divided in the first area and the second area.

5. The electro-optical panel according to claim 1, the switching element being connected to a pixel electrode, and the identification pattern being smaller than the pixel electrode.

6. The electro-optic panel according to claim 1, further including an element substrate and a counter substrate opposing the element substrate,
   the plurality of scanning lines, the plurality of data lines, and the respective switching elements being formed on the element substrate, and a scanning line driving circuit to drive the respective scanning lines and a data line driving circuit to drive the respective data lines being formed in an area that does not overlap the identification pattern.

7. The electro-optic panel according to claim 1, further including an element substrate and a counter substrate opposing the element substrate,
   the plurality of scanning lines, the plurality of data lines, and the respective switching elements being formed on the element substrate, and
   the identification pattern being formed on the counter substrate.

8. The electro-optic panel according to claim 1, the identification pattern being constituted by material that shields light.

9. The electro-optic panel according to claim 1, the identification pattern being constituted by material that reflects light.

10. A manufacturing method of an electro-optic panel that includes a plurality of scanning lines, a plurality of data lines, and transistor elements disposed in a matrix form so as to correspond to intersections of the scanning lines and the data lines, and respective pixel areas, partitioned by the respective scanning lines and the respective data lines, having an effective pixel area that contributes to image display and a dummy pixel area that does not contribute to image display, the method comprising:

forming a semiconductive layer on a substrate;
   forming a gate insulative film on the semiconductive layer; and
   forming an identification pattern to identify at least one of the scanning lines and the data lines in at least a part of the dummy pixel area, concurrently with forming a gate of the transistor element on the gate insulative film.

11. An electronic instrument, comprising:
the electro-optic panel according to claim 1.

* * * * *